(12) United States Patent
Komatsu et al.

(10) Patent No.: US 9,522,714 B2
(45) Date of Patent: Dec. 20, 2016

(54) BICYCLE OPERATING SYSTEM

(71) Applicant: SHIMANO INC., Sakai (JP)

(72) Inventors: Atsushi Komatsu, Sakai (JP); Shingo Sakurai, Sakai (JP)

(73) Assignee: SHIMANO INC., Sakai (JP)

( * ) Notice: Subject to any disclaimer, the term of this patent is extended or adjusted under 35 U.S.C. 154(b) by 113 days.

(21) Appl. No.: 14/583,063

(22) Filed: Dec. 24, 2014

(65) Prior Publication Data

US 2016/0185421 A1    Jun. 30, 2016

(51) Int. Cl.
*B62M 25/08*    (2006.01)
*H04W 76/02*    (2009.01)
*B62M 9/12*    (2006.01)
*B62M 9/122*    (2010.01)
*B62M 9/132*    (2010.01)

(52) U.S. Cl.
CPC ............... *B62M 25/08* (2013.01); *B62M 9/12* (2013.01); *H04W 76/02* (2013.01); *B62M 9/122* (2013.01); *B62M 9/132* (2013.01)

(58) Field of Classification Search
CPC .............................. B62M 25/08; H04W 76/02
See application file for complete search history.

(56) References Cited

U.S. PATENT DOCUMENTS

| 7,902,967 | B2 * | 3/2011 | Takebayashi | B62M 25/08 327/231 |
| 8,655,561 | B2 | 2/2014 | Kitamura | |
| 2014/0102237 | A1 | 4/2014 | Jordan et al. | |
| 2014/0214285 | A1 * | 7/2014 | Wesling | F16H 59/02 701/51 |
| 2014/0358386 | A1 * | 12/2014 | Cracco | B62M 9/122 701/51 |
| 2015/0073625 | A1 * | 3/2015 | Jordan | B62K 23/02 701/2 |
| 2015/0259025 | A1 * | 9/2015 | Sala | B62K 23/06 74/473.12 |
| 2015/0284049 | A1 * | 10/2015 | Shipman | B62M 25/08 74/473.12 |

* cited by examiner

*Primary Examiner* — Todd Melton
(74) *Attorney, Agent, or Firm* — Mori & Ward, LLP

(57) ABSTRACT

A bicycle operating system comprises an operating device. The operating device is configured to be mounted to a bicycle body. The operating device includes an operating switch, a signal controller, and a wireless transmitter. The signal controller is configured to generate a pairing demand signal in response to an input operation of the operating switch. The wireless transmitter is configured to wirelessly transmit the pairing demand signal to a bicycle component to establish a wireless communication with the bicycle component.

26 Claims, 11 Drawing Sheets

|  |  | FS | |
|---|---|---|---|
|  |  | 39 | 53 |
|  |  | LOW | TOP |
| RS | 28 1st | 1.39 | 1.89 |
| | 25 2nd | 1.56 | 2.12 |
| | 23 3rd | 1.70 | 2.30 |
| | 21 4th | 1.86 | 2.52 |
| | 19 5th | 2.05 | 2.79 |
| | 17 6th | 2.29 | 3.12 |
| | 15 7th | 2.60 | 3.53 |
| | 14 8th | 2.79 | 3.79 |
| | 13 9th | 3.00 | 4.08 |
| | 12 10th | 3.25 | 4.42 |
| | 11 11th | 3.55 | 4.82 |

BICYCLE OPERATING SYSTEM

BACKGROUND OF THE INVENTION

Field of the Invention

The present invention relates to a bicycle operating system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating system configured to operate bicycle components. Such bicycle operating systems are configured to mechanically and/or electrically control bicycle components.

SUMMARY OF THE INVENTION

In accordance with a first aspect of the present invention, a bicycle operating system comprises an operating device. The operating device is configured to be mounted to a bicycle body. The operating device includes an operating switch, a signal controller, and a wireless transmitter. The signal controller is configured to generate a pairing demand signal in response to an input operation of the operating switch. The wireless transmitter is configured to wirelessly transmit the pairing demand signal to a bicycle component to establish a wireless communication with the bicycle component.

In accordance with a second aspect of the present invention, the bicycle operating system according to the first aspect is configured so that the signal controller is configured to store identifying information relating to the operating device. The signal controller is configured to generate the pairing demand signal indicative of the identifying information in response to the input operation of the operating switch.

In accordance with a third aspect of the present invention, the bicycle operating system according to the first aspect further comprises a transmission controller. The transmission controller includes a wireless receiver and a control device. The wireless receiver is configured to wirelessly receive the pairing demand signal from the wireless transmitter. The control device is configured to identify the operating device based on the pairing demand signal received by the wireless receiver to establish the wireless communication with the operating device.

In accordance with a fourth aspect of the present invention, the bicycle operating system according to the third aspect is configured so that the transmission controller includes a pairing mode switch configured to bring the control device into a pairing mode in response to a mode switching operation from the user. In the pairing mode, the control device identifies the operating device based on the pairing demand signal received by the wireless receiver.

In accordance with a fifth aspect of the present invention, the bicycle operating system according to the fourth aspect is configured so that the operating device includes a shift operating switch. The signal controller is configured to generate a shift signal in response to an input shift operation of the shift operating switch.

In accordance with a sixth aspect of the present invention, the bicycle operating system according to the fifth aspect is configured so that the wireless transmitter is configured to wirelessly transmit the shift signal to the wireless receiver of the transmission controller. The control device is configured to determine whether the shift signal received by the wireless receiver is transmitted from the wireless transmitter of the operating device which is identified by the control device. The control device controls at least one transmission device to shift speed stages based on the shift signal in a case where it is determined that the shift signal is transmitted from the wireless transmitter of the operating device which is identified by the control device.

In accordance with a seventh aspect of the present invention, the bicycle operating system according to the fourth aspect is configured so that the signal controller is configured to generate a shift signal in response to the input operation of the operating switch.

In accordance with an eighth aspect of the present invention, the bicycle operating system according to the seventh aspect is configured so that the input operation includes a first input operation and a second input operation different from the first input operation. The signal controller is configured to generate the shift signal in response to the first input operation of the operating switch. The signal controller is configured to generate the pairing demand signal in response to the second input operation of the operating switch.

In accordance with a ninth aspect of the present invention, the bicycle operating system according to the eighth aspect is configured so that the wireless transmitter is configured to wirelessly transmit the shift signal to the wireless receiver of the transmission controller. The control device is configured to determine whether the shift signal received by the wireless receiver is transmitted from the wireless transmitter of the operating device which is identified by the control device. The control device controls at least one transmission device to shift speed stages based on the shift signal in a case where it is determined that the shift signal is transmitted from the wireless transmitter of the operating device which is identified by the control device.

In accordance with a tenth aspect of the present invention, the bicycle operating system according to the ninth aspect is configured so that the operating device includes an additional operating switch. The signal controller is configured to generate an additional shift signal in response to an additional input operation of the additional operating switch. The wireless transmitter is configured to wirelessly transmit the additional shift signal to the transmission controller.

In accordance with an eleventh aspect of the present invention, the bicycle operating system according to the tenth aspect is configured so that the control device is configured to determine whether the additional shift signal received by the wireless receiver is transmitted from the wireless transmitter of the operating device which is identified by the control device. The control device controls the at least one transmission device to shift speed stages based on the additional shift signal in a case where it is determined that the additional shift signal is transmitted from the wireless transmitter of the operating device which is identified by the control device.

In accordance with a twelfth aspect of the present invention, the bicycle operating system according to the third aspect is configured so that the control device is configured to automatically enter a pairing mode in a case where the wireless receiver wirelessly receives the pairing demand signal from the operating device. In the pairing mode, the control device identifies the operating device based on the pairing demand signal received by the wireless receiver.

In accordance with a thirteenth aspect of the present invention, the bicycle operating system according to the twelfth aspect is configured so that the signal controller is configured to generate the pairing demand signal indicative of additional identifying information to identify the transmission controller. The control device is configured to determine whether the additional identifying information indicates the transmission controller in the pairing mode. The control device is configured to establish the wireless communication with the operating device in a case where it is determined that the additional identifying information indicates the transmission controller.

In accordance with a fourteenth aspect of the present invention, the bicycle operating system according to the twelfth aspect is configured so that the operating device includes a shift operating switch. The signal controller is configured to generate a shift signal in response to an input shift operation of the shift operating switch.

In accordance with a fifteenth aspect of the present invention, the bicycle operating system according to the fourteenth aspect is configured so that the wireless transmitter is configured to wirelessly transmit the shift signal to the wireless receiver of the transmission controller. The control device is configured to determine whether the shift signal received by the wireless receiver is transmitted from the wireless transmitter of the operating device which is identified by the control device. The control device controls at least one transmission device to shift speed stages based on the shift signal in a case where it is determined that the shift signal is transmitted from the wireless transmitter of the operating device which is identified by the control device.

In accordance with a sixteenth aspect of the present invention, the bicycle operating system according to the twelfth aspect is configured so that the signal controller is configured to generate a shift signal in response to the input operation of the operating switch.

In accordance with a seventeenth aspect of the present invention, the bicycle operating system according to the sixteenth aspect is configured so that the input operation includes a first input operation and a second input operation different from the first input operation. The signal controller is configured to generate the shift signal in response to the first input operation of the operation switch. The signal controller is configured to generate the pairing demand signal in response to the second input operation of the operation switch.

In accordance with an eighteenth aspect of the present invention, the bicycle operating system according to the seventeenth aspect is configured so that the wireless transmitter is configured to wirelessly transmit the shift signal to the wireless receiver of the transmission controller. The control device is configured to determine whether the shift signal received by the wireless receiver is transmitted from the wireless transmitter of the operating device which is identified by the control device. The control device controls at least one transmission device to shift speed stages based on the shift signal in a case where it is determined that the shift signal is transmitted from the wireless transmitter of the operating device which is identified by the control device.

In accordance with a nineteenth aspect of the present invention, the bicycle operating system according to the eighteenth aspect is configured so that the operating device includes an additional operating switch. The signal controller is configured to generate an additional shift signal in response to the additional input operation of the additional operating switch. The wireless transmitter is configured to wirelessly transmit the additional shift signal to the transmission controller.

In accordance with a twentieth aspect of the present invention, the bicycle operating system according to the nineteenth aspect is configured so that the control device is configured to determine whether the additional shift signal received by the wireless receiver is transmitted from the wireless transmitter of the operating device which is identified by the control device. The control device controls the at least one transmission device to shift speed stages based on the additional shift signal in a case where it is determined that the additional shift signal is transmitted from the wireless transmitter of the operating device which is identified by the control device.

In accordance with a twenty-first aspect of the present invention, the bicycle operating system according to the first aspect is configured so that the operating device includes an indicator configured to display a status of the operating device.

In accordance with a twenty-second aspect of the present invention, the bicycle operating system according to the twenty-first aspect is configured so that the indicator is configured to display whether the operating device is in a pairing mode or is not in the pairing mode.

In accordance with a twenty-third aspect of the present invention, the bicycle operating system according to the first aspect further comprises an indicator configured to display at least a status of the operating device.

In accordance with a twenty-fourth aspect of the present invention, the bicycle operating system according to the twenty-third aspect is configured so that the indicator is configured to display whether the operating device is in a pairing mode or is not in the pairing mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 shows a shift table and a transmission route of the bicycle operating system illustrated in FIG. 2;

DESCRIPTION OF THE EMBODIMENTS

Figure 1:
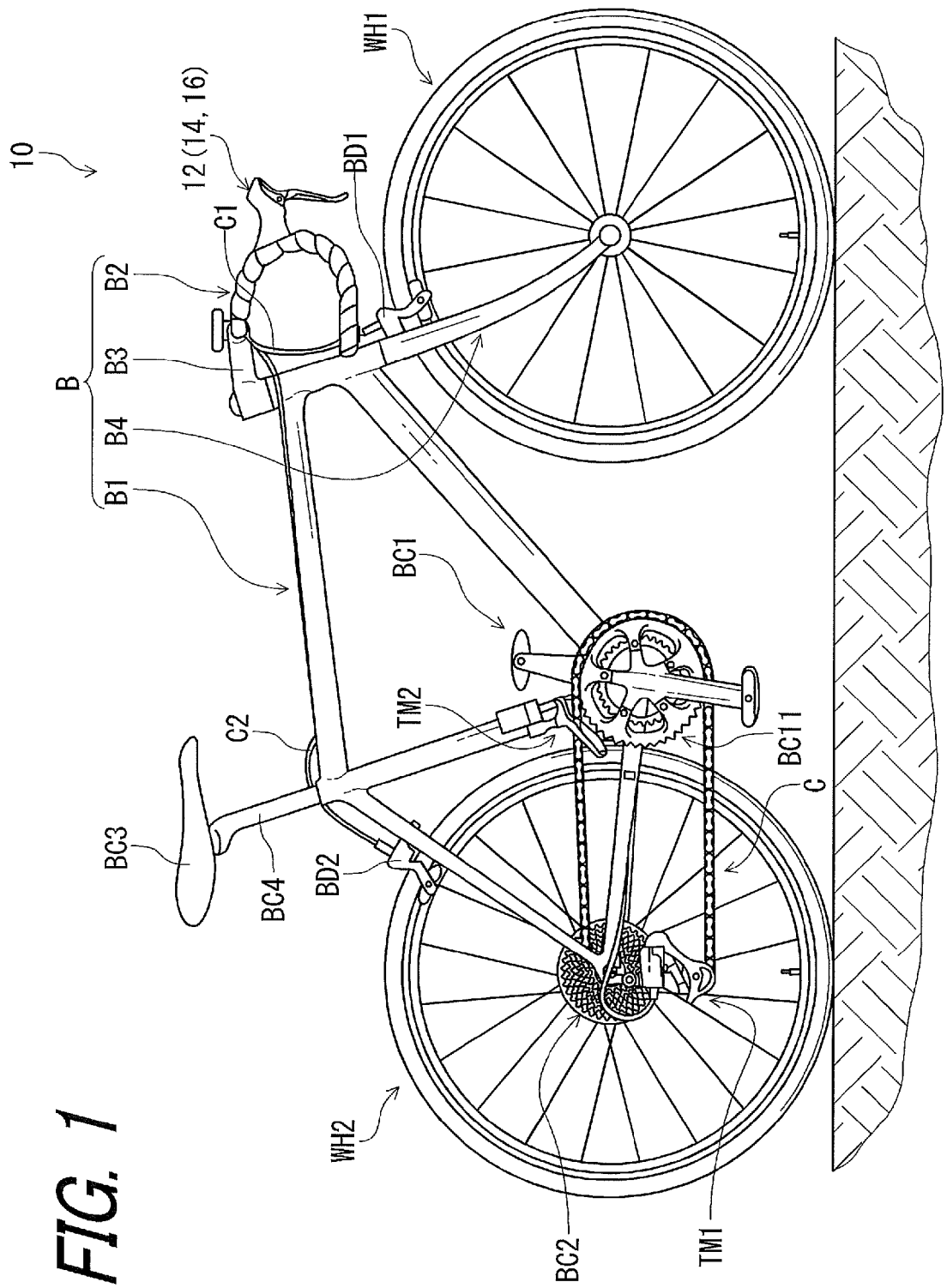
FIG. 1 is a side elevational view of a bicycle equipped with a bicycle operating system in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle operating system 12 in accordance with a first embodiment. While the bicycle 10 is illustrated as a road bike, the bicycle operating system 12 can be applied to mountain bikes or any type of bicycle.

As seen in FIG. 1, the bicycle 10 includes a bicycle body B, a crank assembly BC1, a rear sprocket BC2, a saddle BC3, a seatpost BC4, and a bicycle chain C. The bicycle body B includes a bicycle frame B1, a handlebar B2, a stem B3, and a front fork B4. The handlebar B2 is coupled to the front fork B4 via the stem B3. The bicycle chain C engages with a chain wheel BC11 of the crank assembly BC1 and the rear sprocket BC2. In the illustrated embodiment, the chain wheel BC11 has two speed stages, and the rear sprocket BC2 has eleven speed stages. The saddle BC3 is attached to the bicycle body B via the seatpost BC4.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle BC3 of the bicycle 10 with facing the handlebar B2. Accordingly, these terms, as utilized to describe bicycle components, should be interpreted relative to the bicycle 10 equipped with the bicycle components as used in an upright riding position on a horizontal surface.

Figure 2:
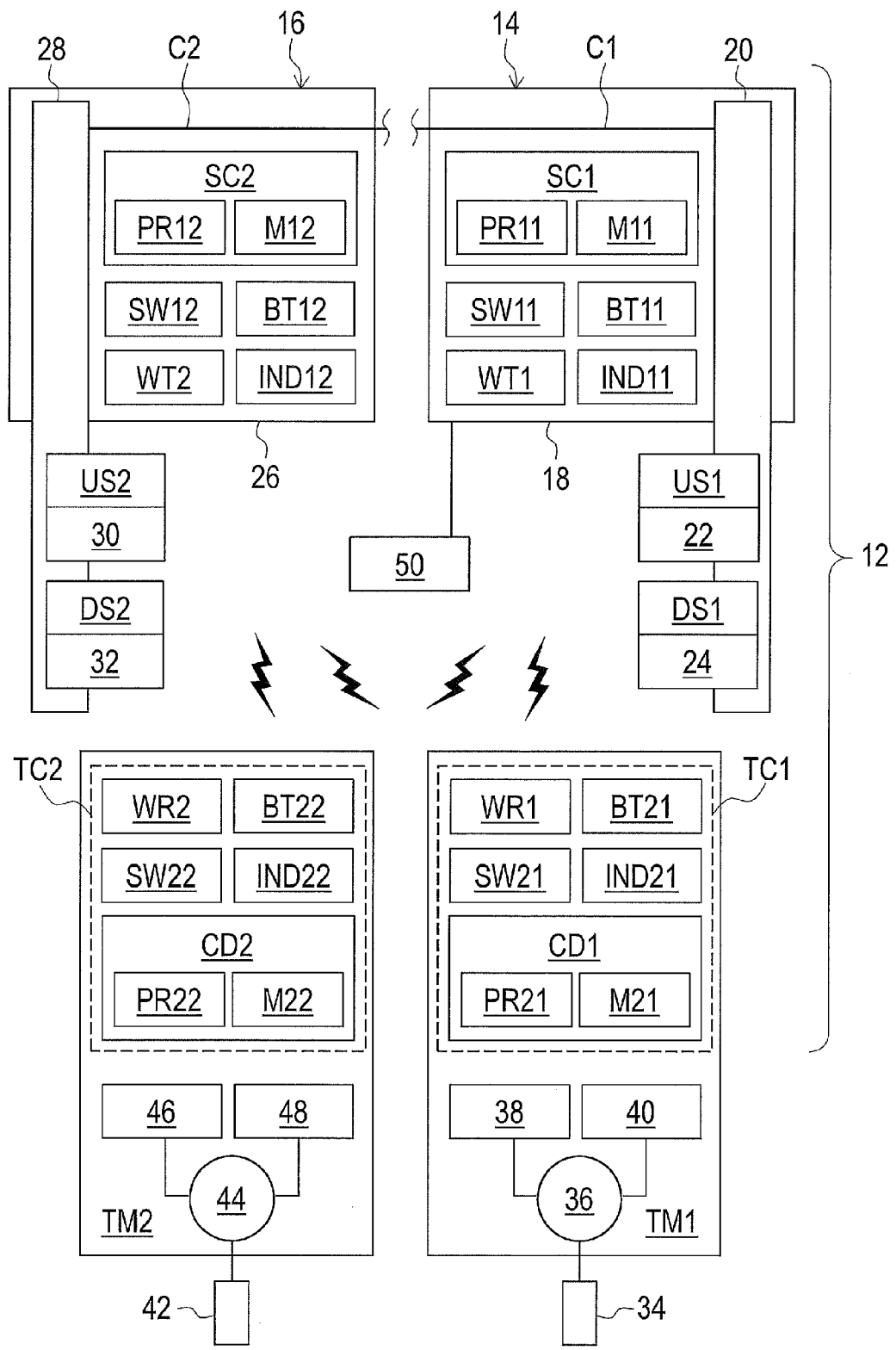
FIG. 2 is a block diagram of the bicycle operating system in accordance with the first embodiment.

As seen in FIG. 2, the bicycle operating system 12 comprises an operating device. In the illustrated embodiment, the bicycle operating system 12 comprises an operating device 14 and an operating device 16. While the operating devices 14 and 16 are separate devices in the illustrated embodiment, the operating devices 14 and 16 can be integrally provided with each other if needed and/or desired. Furthermore, one of the operating devices 14 and 16 can be omitted from the bicycle operating system 12 if needed and/or desired.

Figure 3:
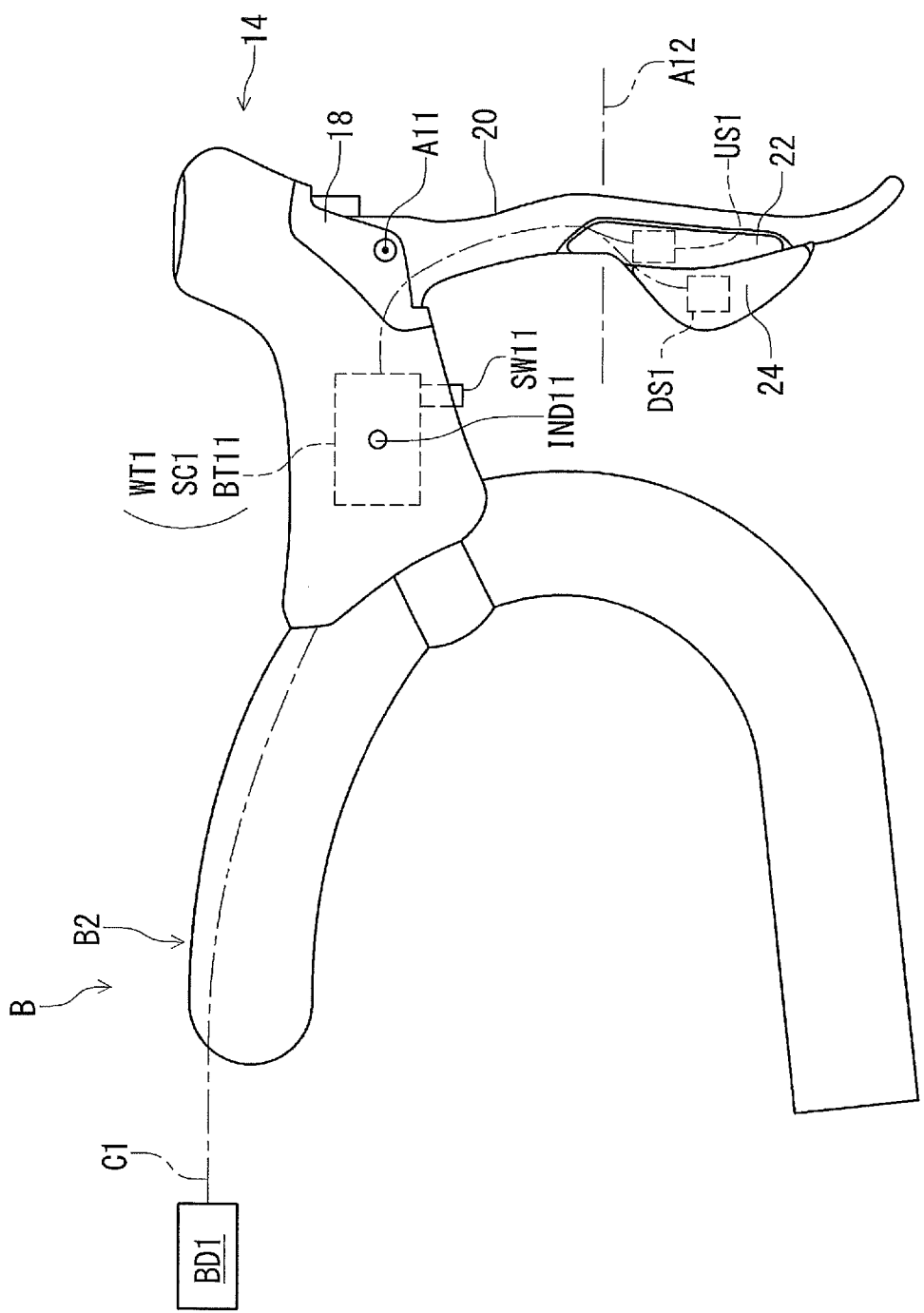
FIG. 3 is a right side elevational view of an operating device of the bicycle operating system illustrated in FIG. 2.
Figure 4:
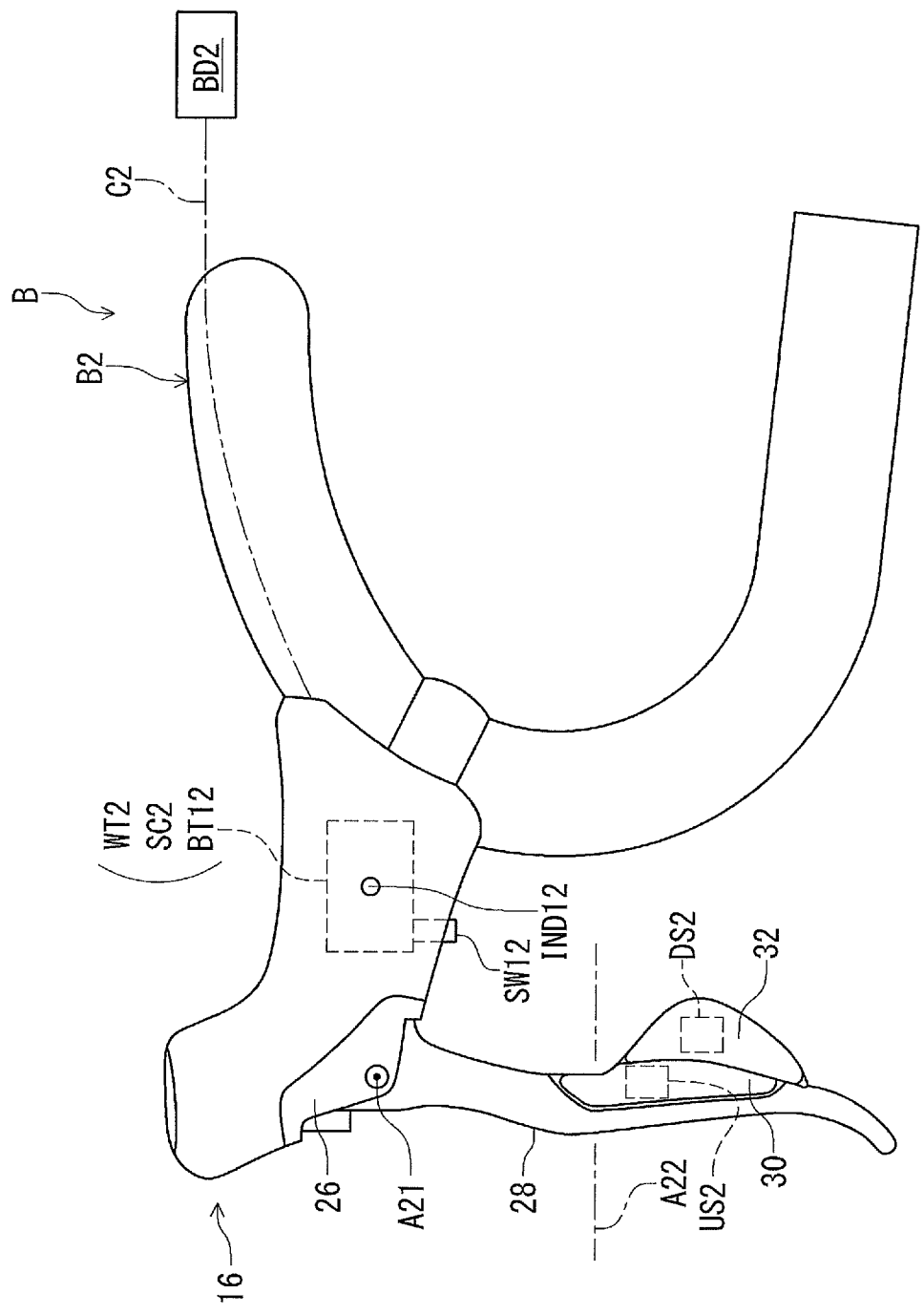
FIG. 4 is a left side elevational view of another operating device of the bicycle operating system illustrated in FIG. 2.

FIGS. 3 and 4, the operating device 14 is configured to be mounted to the bicycle body B (FIG. 1). The operating device 16 is configured to be mounted to the bicycle body B (FIG. 1). While each of the operating devices 14 and 16 is mounted to the handlebar B2 in the illustrated embodiment, the operating devices 14 and 16 can be mounted to other parts of the bicycle body B if needed and/or desired.

As seen in FIGS. 2 and 3, the operating device 14 includes an operating switch SW11, a signal controller SC1, and a wireless transmitter WT1. The signal controller SC1 is configured to generate a pairing demand signal in response to an input operation of the operating switch SW11. The operating switch SW11 is configured to receive the input operation from the user. The wireless transmitter WT1 is configured to wirelessly transmit the pairing demand signal to a bicycle component to establish a wireless communication with the bicycle component.

Similarly, as seen in FIGS. 2 and 4, the operating device 16 includes an operating switch SW12, a signal controller SC2, and a wireless transmitter WT2. The signal controller SC2 is configured to generate a pairing demand signal in response to an input operation of the operating switch SW12. The operating switch SW12 is configured to receive the input operation from the user. The wireless transmitter WT2 is configured to wirelessly transmit the pairing demand signal to a bicycle component to establish a wireless communication with the bicycle component.

As seen in FIG. 2, the signal controller SC1 is constituted as a microcomputer and includes a processor PR11 and a memory M11. The processor PR11 includes a central processing unit (CPU). The memory M11 includes a read only memory (ROM) and a random access memory (RAM). For example, a program stored in the memory Ml 1 is read into the processor PR11, and thereby functions of the signal controller SC1 are performed.

Similarly, the signal controller SC2 is constituted as a microcomputer and includes a processor PR12 and a memory M12. The processor PR12 includes a CPU. The memory M12 includes a ROM and a RAM. For example, a program stored in the memory M12 is read into the processor PR12, and thereby functions of the signal controller SC2 are performed.

While each of the signal controllers SC1 and SC2 is illustrated as a single unit in FIG. 2, at least one of the signal controllers can be part of another component or can be part of several components (e.g., multiple controllers located in different parts). Furthermore, the signal controllers SC1 and SC2 can be integrally provided with each other. One of the signal controllers SC1 and SC2 can be omitted from the bicycle operating system 12 if needed and/or desired.

The bicycle operating system 12 farther comprises a transmission controller as the bicycle component. In the illustrated embodiment, the bicycle operating system 12 comprises a transmission controller TC1 and a transmission controller TC2 as the bicycle component.

While each of the transmission controllers TC1 and TC2 is illustrated as a single unit in FIG. 2, at least one of the transmission controllers TC1 and TC2 can be part of another component or can be part of several components (e.g., multiple controllers located in different parts). Furthermore, the transmission controllers TC1 and TC2 can be integrally provided with each other. One of the transmission controllers TC1 and TC2 can be omitted from the bicycle operating system 12 if needed and/or desired.

The wireless transmitter WT1 of the operating device 14 is configured to wirelessly transmit the pairing demand signal to the transmission controller TC1 to establish the wireless communication with the transmission controller TC1. The wireless transmitter WT1 is also configured to wirelessly transmit the pairing demand signal to the transmission controller TC2 to establish the wireless communication with the transmission controller TC2.

The wireless transmitter WT2 of the operating device 16 is configured to wirelessly transmit the pairing demand signal to the transmission controller TC1 to establish the wireless communication with the transmission controller TC1. The wireless transmitter WT2 is also configured to wirelessly transmit the pairing demand signal to the transmission controller TC2 to establish the wireless communication with the transmission controller TC2.

The transmission controller TC1 is configured to control at least one transmission device to shift speed stages. The transmission controller TC2 is configured to control at least one transmission device to shift speed stages. In the illustrated embodiment, the transmission controller TC1 is configured to control a first transmission device TM1 to shift speed stages. The transmission controller TC2 is configured to control a second transmission device TM2 to shift speed stages. In a case where the transmission controllers TC1 and TC2 are integrally provided with each other or where one of the transmission controllers TC1 and TC2 is omitted from the bicycle operating system 12, the single transmission controller is configured to control the first and second transmission devices TM1 and TM2.

In the illustrated embodiment, as seen in FIG. 1, the first transmission device TM1 is a rear derailleur configured to shift the bicycle chain C between sprockets of the rear sprocket BC2. The second transmission device TM2 is a front derailleur configured to shift the bicycle chain C between sprockets of the chain wheel BC11. While the first transmission device TM1 is a rear derailleur and the second transmission device TM2 is a front derailleur in the illustrated embodiment, any type of transmission device can be applied to the first transmission device TM1 and the second transmission device TM2. Possible examples of the transmission devices TM1 and TM2 include the front derailleur, the rear derailleur, an internal hub transmission, a continuously variable transmission, and a gearbox.

While the transmission devices TM1 and TM2 are separate devices in the illustrated embodiment, the transmission devices TM1 and TM2 can be integrally provided with each other if needed and/or desired. Furthermore, one of the transmission devices TM1 and TM2 can be omitted from the bicycle operating system 12 if needed and/or desired.

The transmission controller TC1 includes a wireless receiver WR1 configured to wirelessly receive the pairing demand signal from the wireless transmitter WT1. The transmission controller TC2 includes a wireless receiver WR2 configured to wirelessly receive the pairing demand signal from the wireless transmitter WT2.

In the illustrated embodiment, the wireless receiver WR1 is configured to wirelessly receive the pairing demand signal from the wireless transmitter WT2. The wireless receiver WR2 is configured to wirelessly receive the pairing demand signal from the wireless transmitter WT1.

While the wireless receivers WR1 and WR2 are separate devices in the illustrated embodiment, the wireless receivers WR1 and WR2 can be integrally provided with each other if needed and/or desired. Furthermore, one of the wireless receivers WR1 and WR2 can be omitted from the transmission controllers TC1 and TC2 if needed and/or desired.

In the illustrated embodiment, the operating device 14 includes the wireless transmitter WT1 in the illustrated embodiment, and the transmission controller TC1 includes the wireless receiver WR1. However, the operating device 14 can include a wireless receiver in addition to the wireless transmitter WT1 if needed and/or desired. Furthermore, the transmission controller TC1 can include a wireless transmitter in addition to the wireless receiver WR1 if needed and/or desired. In such an embodiment, it is possible to establish a two-way communication between the operating device 14 and the transmission controller TC1. Such configurations can be applied to the operating device 16 and the transmission controller TC2.

The operating device 14 includes a shift operating switch. In the illustrated embodiment, the operating device 14 includes a shift operating switch US1 and a shift operating switch DS1. The shift operating switches US1 and DS1 are electrically connected to the signal controller SC1. In the illustrated embodiment, the shift operating switch US1 is configured to receive the input shift operation (e.g., an input upshift operation) from the user. The shift operating switch DS1 is configured to receive the input shift operation (e.g., an input downshift operation) from the user. The signal controller SC1 is configured to detect each of the input upshift operation and the input downshift operation. The shift operating switch US1 can be also referred to as an additional operating switch US1 or an upshift operating switch US1. The shift operating switch DS1 can be also referred to as an additional operating switch DS1 or a downshift operating switch DS1.

The signal controller SC1 is configured to generate a shift signal in response to the input shift operation of the shift operating switch US1. The signal controller SC1 is configured to generate a shift signal in response to the input shift operation of the shift operating switch DS1. In the illustrated embodiment, the signal controller SC1 is configured to generate an upshift signal in response to the input upshift operation of the shift operating switch US1. The signal controller SC1 is configured to generate a downshift signal in response to the input downshift operation of the shift operating switch DS1.

The wireless transmitter WT1 is configured to wirelessly transmit the shift signal to the wireless receiver WR1 of the transmission controller TC1. The wireless transmitter WT1 is configured to wirelessly transmit the shift signal to the wireless receiver WR2 of the transmission controller TC2. In the illustrated embodiment, the wireless transmitter WT1 is configured to wirelessly transmit the upshift signal to the wireless receivers WR1 and WR2. The wireless transmitter WT1 is configured to wirelessly transmit the downshift signal to the wireless receivers WR1 and WR2. For example, the wireless transmitter WT1 is configured to superimpose the shift signal on carrier wave using a predetermined wireless communication protocol to generate wireless signals indicative of the input shift operation.

The operating device 16 includes a shift operating switch. In the illustrated embodiment, the operating device 16 includes a shift operating switch US2 and a shift operating switch DS2. The shift operating switches US2 and DS2 are electrically connected to the signal controller SC2. In the illustrated embodiment, the shift operating switch US2 is configured to receive the input shift operation (e.g., an input upshift operation) from the user. The shift operating switch DS2 is configured to receive the input shift operation (e.g., an input downshift operation) from the user. The signal controller SC2 is configured to detect each of the input upshift operation and the input downshift operation. The shift operating switch US2 can be also referred to as an upshift operating switch US2. The shift operating switch DS2 can be also referred to as a downshift operating switch DS2.

The signal controller SC2 is configured to generate a shift signal in response to the input shift operation of the shift operating switch US2. The signal controller SC2 is configured to generate a shift signal in response to the input shift operation of the shift operating switch DS2. In the illustrated embodiment, the signal controller SC2 is configured to generate an upshift signal in response to the input upshift operation of the shift operating switch US2. The signal controller SC2 is configured to generate a downshift signal in response to the input downshift operation of the shift operating switch DS2.

The wireless transmitter WT2 is configured to wirelessly transmit the shift signal to the wireless receiver WR1 of the transmission controller TC1. The wireless transmitter WT2 is configured to wirelessly transmit the shift signal to the wireless receiver WR2 of the transmission controller TC2. In the illustrated embodiment, the wireless transmitter WT2 is configured to wirelessly transmit the upshift signal to the wireless receivers WR1 and WR2. The wireless transmitter WT2 is configured to wirelessly transmit the downshift signal to the wireless receivers WR1 and WR2. For example, the wireless transmitter WT2 is configured to superimpose the shift signal on carrier wave using a predetermined wireless communication protocol to transmit the shift signal as wireless signals.

The transmission controller TC1 is configured to control the first transmission device TM1 to shift speed stages in response to the shift signal (e.g., the upshift signal and the downshift signal) from at least one of the operating devices 14 and 16. The transmission controller TC2 is configured to control the second transmission device TM2 to shift speed stages in response to the shift signal (e.g., the upshift signal and the downshift signal) from at least one of the operating devices 14 and 16.

As seen in FIGS. 2 and 3, the operating device 14 includes a base member 18 and a lever 20. The base member 18 is configured to be detachably attached to the bicycle body B (FIG. 1). The lever 20 is pivotally mounted to the base member 18 about a pivot axis A11. The lever 20 is operatively connected to the brake device BD1 via a control cable C1. In the illustrated embodiment, the operating switch SW11, the signal controller SC1, and the wireless transmitter WT1 are mounted to the base member 18. While the base member 18 is detachably attached to the handlebar B2 (FIG. 1) in the illustrated embodiment, the base member 18 can be attached to other part of the bicycle body B if needed and/or desired.

As seen in FIGS. 2 and 3, the shift operating switch US1 and the shift operating switch DS1 are mounted on the lever 20. The operating device 14 includes an upshift operating member 22 and a downshift operating member 24. The upshift operating member 22 is configured to be operated by the user and is operatively coupled to the shift operating switch US1. The downshift operating member 24 is configured to be operated by the user and is operatively coupled to the shift operating switch DS1. The upshift operating member 22 and the downshift operating member 24 are movably mounted on the lever 20. For example, the upshift operating member 22 and the downshift operating member 24 are pivotally mounted on the lever 20 about a pivot axis A12 which is non-parallel to the pivot axis A11. The shift operating switch US1 is configured to be turned on (activated) in response to the input shift operation from the upshift operating member 22. The shift operating switch DS1 is configured to be turned on (activated) in response to the input shift operation from the downshift operating member 24.

As seen in FIGS. 2 and 4, the operating device 16 includes a base member 26 and a lever 28. The base member 26 is configured to be detachably attached to the bicycle body B (FIG. 1). The lever 28 is pivotally mounted to the base member 26 about a pivot axis A21. The lever 28 is operatively connected to the brake device BD2 via a control cable C2. In the illustrated embodiment, the operating switch SW12, the signal controller SC2, and the wireless transmitter WT2 are mounted to the base member 26. While the base member 26 is detachably attached to the handlebar B2 (FIG. 1) in the illustrated embodiment, the base member 26 can be attached to other part of the bicycle body B if needed and/or desired.

As seen in FIGS. 2 and 4, the shift operating switch US2 and the shift operating switch DS2 are mounted on the lever 28. The operating device 16 includes an upshift operating member 30 and a downshift operating member 32. The upshift operating member 30 is configured to be operated by the user and is operatively coupled to the shift operating switch US2. The downshift operating member 32 is configured to be operated by the user and is operatively coupled to the shift operating switch DS2. The upshift operating member 30 and the downshift operating member 32 are movably mounted on the lever 28. For example, the upshift operating member 30 and the downshift operating member 32 are pivotally mounted on the lever 28 about a pivot axis A22 which is non-parallel to the pivot axis A21. The shift operating switch US2 is configured to be turned on (activated) in response to the input shift operation from the upshift operating member 30. The shift operating switch DS2 is configured to be turned on (activated) in response to the input shift operation from the downshift operating member 32.

As seen in FIG. 2, the signal controller SC1 is configured to store identifying information relating to the operating device 14. The signal controller SC2 is configured to store identifying information relating to the operating device 16. More specifically, the signal controller SC1 is configured to store the identifying information relating to the operating device 14 in the memory M11. The signal controller SC2 is configured to store the identifying information relating to the operating device 16 in the memory M12. Possible examples of the identifying information include a device identification (ID) such as a model number of each of the operating devices 14 and 16.

The signal controller SC1 is configured to generate the pairing demand signal indicative of the identifying information in response to the input operation of the operating switch SW11. The wireless transmitter WT1 is configured to superimpose the pairing demand signal on carrier wave using the predetermined wireless communication protocol to transmit the pairing demand signal as wireless signals.

Similarly, the signal controller SC2 is configured to generate the pairing demand signal indicative of the identifying information in response to the input operation of the operating switch SW12. The wireless transmitter WT2 is configured to superimpose the pairing demand signal on carrier wave using the predetermined wireless communication protocol to transmit the pairing demand signal as wireless signals.

As seen in FIG. 2, the transmission controller TC1 includes a control device CD1 configured to identify the operating device 14 based on the pairing demand signal received by the wireless receiver WR1 to establish the wireless communication with the operating device 14. The control device CD1 is configured to identify the operating device 16 based on the pairing demand signal received by the wireless receiver WR1 to establish the wireless communication with the operating device 16.

Similarly, the transmission controller TC2 includes a control device CD2 configured to identify the operating device 14 based on the pairing demand signal received by the wireless receiver WR2 to establish the wireless communication with the operating device 14. The control device CD2 is configured to identify the operating device 16 based on the pairing demand signal received by the wireless receiver WR2 to establish the wireless communication with the operating device 16.

As seen in FIG. 2, the control device CD1 is constituted as a microcomputer and includes a processor PR21 and a memory M21. The processor PR21 includes a CPU. The memory M21 includes a ROM and a RAM. For example, a program stored in the memory M21 is read into the processor PR21, and thereby functions of the control device CD1 are performed.

The control device CD2 is constituted as a microcomputer and includes a processor PR22 and a memory M22. The processor PR22 includes a CPU. The memory M22 includes a ROM and a RAM. For example, a program stored in the memory M22 is read into the processor PR22, and thereby functions of the control device CD2 are performed.

While each of the control devices CD1 and CD2 is illustrated as a single unit in FIG. 2, at least one of the control devices CD1 and CD2 can be part of another component or can be part of several components (e.g., multiple controllers located in different parts). Furthermore, the control devices CD1 and CD2 can be integrally provided with each other.

Figure 5:
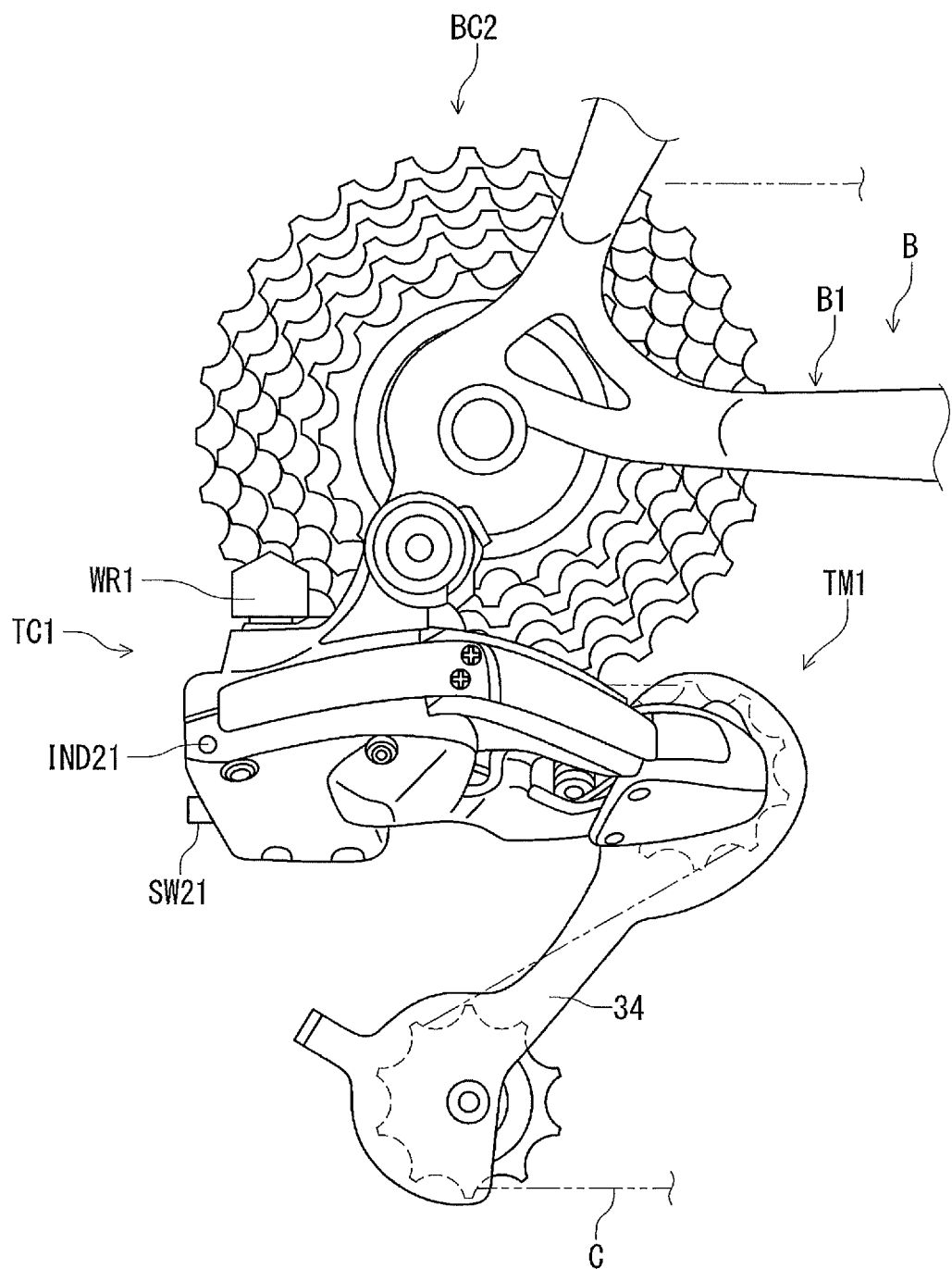
FIG. 5 is a side elevational view of a transmission device of the bicycle operating system illustrated in FIG. 2.

As seen in FIGS. 2 and 5, the transmission controller TC1 includes a pairing mode switch SW21 configured to bring the control device CD1 into a pairing mode in response to a mode switching operation from the user. The pairing mode switch SW21 is configured to receive the mode switching operation from the user to bring the control device CD1 into the pairing mode. The control device CD1 enters the pairing mode when the pairing mode switch SW21 is operated by the user.

Figure 6:
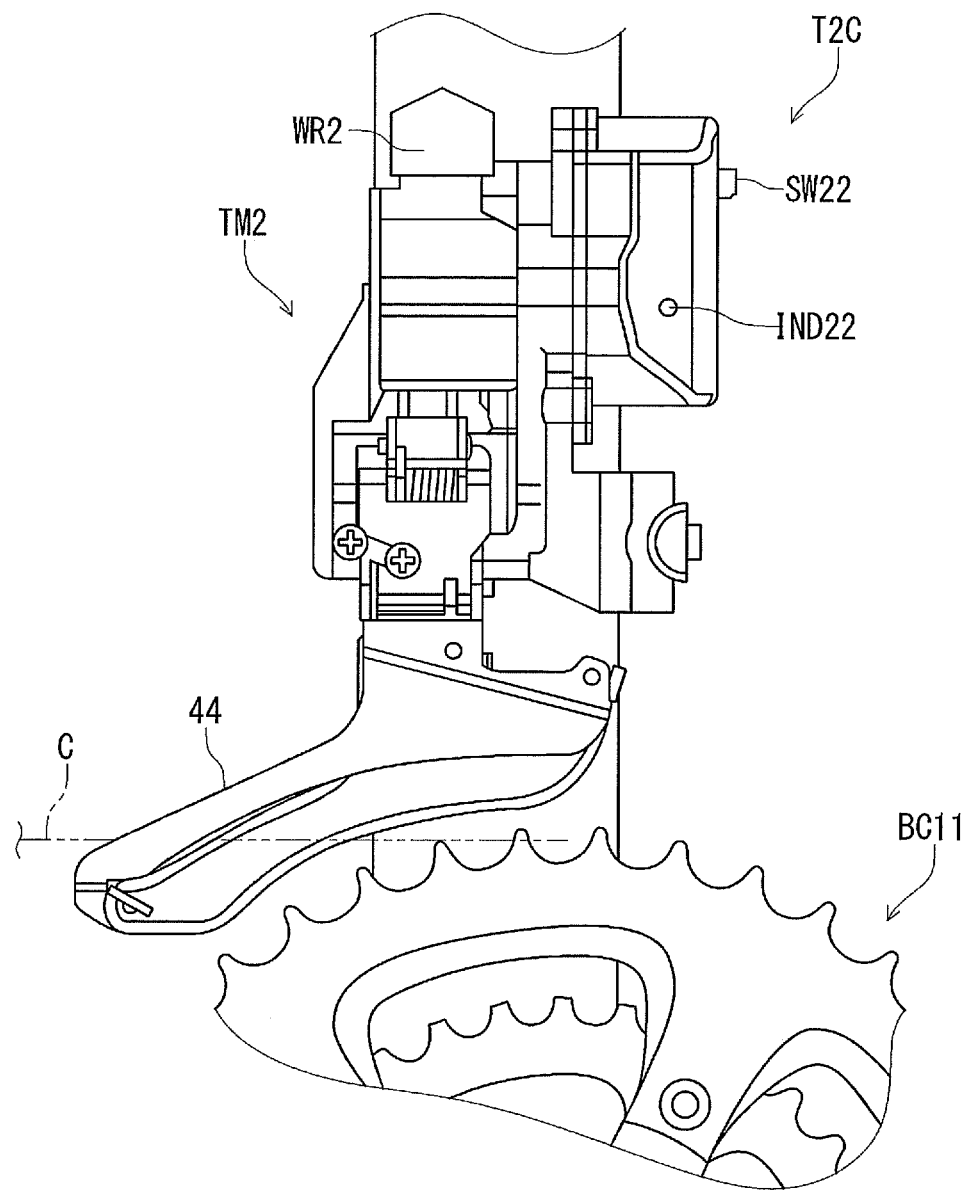
FIG. 6 is a side elevational view of another transmission device of the bicycle operating system illustrated in FIG. 2.

Similarly, as seen in FIGS. 2 and 6, the transmission controller TC2 includes a pairing mode switch SW22 configured to bring the control device CD2 into a pairing mode in response to a mode switching operation from the user. The pairing mode switch SW22 is configured to receive the mode switching operation from the user to bring the control device CD2 into the pairing mode. The control device CD2 enters the pairing mode when the pairing mode switch SW22 is operated by the user.

While the pairing mode switches SW21 and SW22 are separate switches in the illustrated embodiment, the pairing mode switches SW21 and SW22 can be integrally provided with each other if needed and/or desired. Furthermore, at least one of the pairing mode switches SW21 and SW22 can be omitted from the transmission controllers TC1 and TC2 if needed and/or desired.

In the pairing mode of the transmission controller TC1, the control device CD1 identifies the operating device 14 based on the pairing demand signal received by the wireless receiver WR1. In the pairing mode of the transmission controller TC1, the control device CD1 controls the wireless receiver WR1 to scan wireless signals on specific channels. The signal controller SC1 controls the wireless transmitter WT1 to repeatedly transmit a wireless signal indicating the identifying information of the operating device 14 when the operating switch SW11 is operated by the user.

The wireless receiver WR1 receives the wireless signal indicating the identifying information of the operating device 14. The control device CD1 is configured to store reference ID data and reference signal patterns corresponding to the reference ID data in the memory M21 in advance. The reference ID data indicate device IDs of operating devices which are configured to establish a wireless communication with the transmission controller TC1.

The control device CD1 is configured to compare the identifying information of the operating device 14 with the reference ID data. The control device CD1 is configured to determine, among the reference signal patterns, a target signal pattern corresponding to the identifying information received by the wireless receiver WR1. The control device CD1 is configured to temporarily store the identifying information of the operating device 14 and the determined target signal pattern in the memory M21.

The control device CD1 is configured to interpret, using the target signal pattern, the wireless signals transmitted from the wireless transmitter WT1 as separate signals from wireless signals transmitted from other devices. Thus, the control device CD1 establishes the wireless communication with the operating device 14. In the illustrated embodiment, the pairing mode is finished in the transmission controller TC1 when the pairing mode switch SW21 is operated in the pairing mode.

While the above operations in the pairing mode between the operating device 14 and the transmission controller TC1 is applied to the pairing mode between the operating device 16 and the transmission controller TC1, they will not be described in detail here for the sake of brevity.

In the pairing mode of the transmission controller TC2, the control device CD2 identifies the operating device 16 based on the pairing demand signal received by the wireless receiver WR2. In the pairing mode of the transmission controller TC2, the control device CD2 controls the wireless receiver WR2 to scan wireless signals on specific channels. The signal controller SC2 controls the wireless transmitter WT2 to repeatedly transmit a wireless signal indicating the identifying information of the operating device 16 when the operating switch SW12 is operated by the user.

The wireless receiver WR2 receives the wireless signal indicating the identifying information of the operating device 16. The control device CD2 is configured to store reference ID data and reference signal patterns corresponding to the reference ID data in the memory M22 in advance. The reference ID data indicate device IDs of operating devices which are configured to establish a wireless communication with the transmission controller TC2.

The control device CD2 is configured to compare the identifying information of the operating device 16 with the reference ID data. The control device CD2 is configured to determine, among the reference signal patterns, a target signal pattern corresponding to the identifying information received by the wireless receiver WR2. The control device CD2 is configured to temporarily store the identifying information of the operating device 16 and the determined target signal pattern in the memory M22.

The control device CD2 is configured to interpret, using the target signal pattern, the wireless signals transmitted from the wireless transmitter WT2 as separate signals from wireless signals transmitted from other devices. Thus, the control device CD2 establishes the wireless communication with the operating device 16. In the illustrated embodiment, the pairing mode is finished in the transmission controller TC2 when the pairing mode switch SW22 is operated in the pairing mode.

While the above operations of the pairing mode between the operating device 16 and the transmission controller TC2 is applied to the pairing mode between the operating device 14 and the transmission controller TC2, they will not be described in detail here for the sake of brevity.

As seen in FIG. 2, the operating device 14 includes an indicator IND11 configured to display a status of the operating device 14. The indicator IND11 is configured to display whether the operating device 14 is in the pairing mode or is not in the pairing mode. Possible examples of the indicator IND11 include a light emitting diode (LED) configured to emit light in accordance with the state of the operating device 14 and the pairing mode of the operating device 14. As seen in FIG. 3, the indicator IND11 is mounted to the base member 18 of the operating device 14.

As seen in FIG. 2, the operating device 16 includes an indicator IND12 configured to display a status of the operating device 16. The indicator IND12 is configured to display whether the operating device 16 is in the pairing mode or is not in the pairing mode. Possible examples of the indicator IND12 include a LED configured to emit light in accordance with the state of the operating device 16 and the pairing mode of the operating device 16. As seen in FIG. 3, the indicator IND12 is mounted to the base member 26 of the operating device 16.

As seen in FIGS. 2 and 5, the transmission controller TC1 includes an indicator IND21 configured to display a status of the transmission controller TC1. The indicator IND21 is configured to display whether the transmission controller TC1 is in the pairing mode or is not in the pairing mode. Possible examples of the indicator IND21 include a LED configured to emit light in accordance with the state of the transmission controller TC1 and the pairing mode of the transmission controller TC1.

Similarly, as seen in FIGS. 2 and 6, the transmission controller TC2 includes an indicator IND22 configured to display a status of the transmission controller TC2. The indicator IND22 is configured to display whether the transmission controller TC2 is in the pairing mode or is not in the pairing mode. Possible examples of the indicator IND22 include a LED configured to emit light in accordance with the state of the transmission controller TC2 and the pairing mode of the transmission controller TC2.

As seen in FIGS. 2 and 3, the operating device 14 includes a power supply device BT11 configured to supply electrical power to at least one of the operating switch SW11, the signal controller SC1, the wireless transmitter WT1, and the indicator IND11. In the illustrated embodiment, the power supply device BT11 is configured to supply electrical power to the operating switch SW11, the signal controller SC1, the wireless transmitter WT1, and the indicator IND11. The power supply device BT11 is a battery, for example. In the illustrated embodiment, the power supply device BT11 is mounted to the base member 18.

Similarly, as seen in FIGS. 2 and 4, the operating device 16 includes a power supply device BT12 configured to supply electrical power to at least one of the operating switch SW12, the signal controller SC2, the wireless transmitter WT2, and the indicator IND12. In the illustrated embodiment, the power supply device BT12 is configured to supply electrical power to the operating switch SW12, the signal controller SC2, the wireless transmitter WT2, and the indicator IND12. The power supply device BT12 is a battery, for example. In the illustrated embodiment, the power supply device BT11 is mounted to the base member 26.

As seen in FIG. 2, the transmission controller TC1 includes a power supply device BT21 configured to supply electrical power to at least one of the wireless receiver WR1, the control device CD1, and the indicator IND21. In the illustrated embodiment, the power supply device BT21 is configured to supply electrical power to the wireless receiver WR1, the control device CD1, and the indicator IND21. The power supply device BT21 is a battery, for example.

Similarly, the transmission controller TC2 includes a power supply device BT22 configured to supply electrical power to at least one of the wireless receiver WR2, the control device CD2, and the indicator IND22. In the illustrated embodiment, the power supply device BT22 is configured to supply electrical power to the wireless receiver WR2, the control device CD2, and the indicator IND22. The power supply device BT22 is a battery, for example.

As seen in FIG. 2, the first transmission device TM1 includes a chain guide 34, a guide actuator 36, a position sensor 38, and a driver unit 40. The chain guide 34 is configured to shift the bicycle chain C between speed stages of the rear sprocket BC2. The guide actuator 36 is configured to move the chain guide 34 to shift the bicycle chain C relative to the rear sprocket BC2. Possible examples of the guide actuator 36 include a direct current motor and a stepper motor.

The position sensor 38 is configured to sense a current position of the guide actuator 36 for determining a current speed stage of the first transmission device TM1. Possible examples of the position sensor 38 include a potentiometer, a rotary encoder, and a hall sensor. The driver unit 40 is configured to control the guide actuator 36 based on the current position of the guide actuator 36 and driving signals from the control device CD1. The control device CD1 is configured to generate the driving signals based on the shift signals from the operating device 14. In the illustrated embodiment, the power supply device BT21 is also configured to supply electrical power to the guide actuator 36, the position sensor 38, and the driver unit 40.

As seen in FIG. 2, the second transmission device TM2 includes a chain guide 42, a guide actuator 44, a position sensor 46, and a driver unit 48. The chain guide 42 is configured to shift the bicycle chain C between speed stages of the chain wheel BC11. The guide actuator 44 is configured to move the chain guide 42 to shift the bicycle chain C relative to the chain wheel BC11. Possible examples of the guide actuator 44 include a direct current motor and a stepper motor.

The position sensor 46 is configured to sense a current position of the guide actuator 44 for determining a current speed stage of the second transmission device TM2. Possible examples of the position sensor 46 include a potentiometer, a rotary encoder, and a hall sensor. The driver unit 48 is configured to control the guide actuator 44 based on the current position of the guide actuator 44 and driving signals from the control device CD2. The control device CD2 is configured to generate the driving signals based on the second control signals from the operating device 16. In the illustrated embodiment, the power supply device BT22 is also configured to supply electrical power to the guide actuator 44, the position sensor 46, and the driver unit 48.

Each of the transmission controllers TC1 and TC2 has a shifting mode different from the pairing mode. In the illustrated embodiment, each of the transmission controllers TC1 and TC2 has a normal mode and a synchro mode as the shifting mode. Each of the transmission controllers TC1 and TC2 can have only one of the normal mode and the synchro mode as the shifting mode. Each of the transmission controllers TC1 and TC2 can have a shifting mode other than the normal mode and the synchro mode.

In the normal mode, the transmission controller TC1 controls the first transmission device TM1 in response to the shift signal from only the operating device 14. Furthermore, in the normal mode, the transmission controller TC2 controls the second transmission device TM2 in response to the shift signal from only the operating device 16.

In the synchro mode, however, only one of the operating devices 14 and 16 is used to control the transmission controllers TC1 and TC2. In the synchro mode, for example, the transmission controller TC1 controls the first transmission device TM1 in accordance with a transmission route in response to a single shift signal from only the operating device 14. Similarly, in the synchro mode, the transmission controller TC2 controls the first transmission device TM1 in accordance with the transmission route in response to a single shift signal from only the operating device 14. The control device CD1 is configured to store the transmission route in the memory M21. The control device CD2 is configured to store the transmission route in the memory M22.

As seen in FIG. 2, the bicycle operating system 12 further comprises a mode selector 50 configured to allow the user to select a shifting mode among the synchro mode and the normal mode. The mode selector 50 is mounted on the bicycle body B (FIG. 1), for example. The mode selector 50 can be mounted to one of the operating devices 14 and 16. The mode selector 50 is electrically connected to the signal controller SC1. The signal controller SC1 is configured to generate a mode signal indicative of the shifting mode selected via the mode selector 50. The wireless transmitter WT1 wirelessly transmits the shifting mode selected via the mode selector 50 to each of the transmission controllers TC1 and TC2. Each of the transmission controllers TC1 and TC2 is configured to set the shifting mode based on a mode selected via the mode selector 50.

In the shifting mode of the transmission controller TC1, the control device CD1 is configured to determine whether the shift signal received by the wireless receiver WR1 is transmitted from the wireless transmitter of the operating device which is identified by the control device CD1. In a case where the operating device 14 is identified by the control device CD1 in the pairing mode of the transmission controller TC1, the control device CD1 determines whether the shift signal received by the wireless receiver WR1 is transmitted from the wireless transmitter WT1 of the operating device 14 using the reference signal patterns. In a case where the operating devices 14 and 16 are identified by the control device CD1 in the pairing mode of the transmission controller TC1, the control device CD1 determines whether the shift signal received by the wireless receiver WR1 is transmitted from the wireless transmitter WT1 of the operating device 14 or the wireless transmitter WT2 of the operating device 16 using the reference signal patterns.

Similarly, in the shifting mode of the transmission controller TC2, the control device CD2 is configured to determine whether the shift signal received by the wireless receiver WR2 is transmitted from the wireless transmitter of the operating device which is identified by the control device CD2. In a case where the operating device 16 is identified by the control device CD2 in the pairing mode of the transmission controller TC2, the control device CD2 determines whether the shift signal received by the wireless receiver WR2 is transmitted from the wireless transmitter WT2 of the operating device 16 using the reference signal patterns. In a case where the operating devices 14 and 16 are identified by the control device CD2 in the pairing mode of the transmission controller TC2, the control device CD2 determines whether the shift signal received by the wireless receiver WR2 is transmitted from the wireless transmitter WT1 of the operating device 14 or the wireless transmitter WT2 of the operating device 16 using the reference signal patterns.

The control device CD1 controls at least one transmission device to shift speed stages based on the shift signal in a case where it is determined that the shift signal is transmitted from the wireless transmitter of the operating device which is identified by the control device CD1. In the normal mode, for example, the control device CD1 controls the first transmission device TM1 to shift speed stages based on the shift signal transmitted from the wireless transmitter WT1 of the operating device 14 regardless of the transmission route. In the synchro mode, the control device CD1 controls the first transmission device TM1 to shift speed stages in accordance with the transmission route based on the shift signal transmitted from the wireless transmitter WT1 of the operating device 14 regardless of the shift signal from the operating device 16.

Similarly, the control device CD2 controls at least one transmission device to shift speed stages based on the shift signal in a case where it is determined that the shift signal is transmitted from the wireless transmitter of the operating device which is identified by the control device CD2. In the normal mode, for example, the control device CD2 controls the second transmission device TM2 to shift speed stages based on the shift signal transmitted from the wireless transmitter WT2 of the operating device 16 regardless of the transmission route. In the synchro mode, the control device CD2 controls the second transmission device TM2 to shift speed stages in accordance with the transmission route based on the shift signal transmitted from the wireless transmitter WT1 of the operating device 14 regardless of the shift signal from the operating device 16.

FIG. 7 shows a shift table including gear ratios, a total number of teeth of each sprocket element in the chain wheel BC11 ("FS"), and a total number of teeth of each sprocket element in the rear sprocket BC2 ("RS"). The control device CD1 is configured to store the shift table for the bicycle operating system 12 in the memory M21. The control device CD2 is configured to store the shift table for the bicycle operating system 12 in the memory M22. In the illustrated embodiment, the first transmission device TM1 has low and top gears as the speed stage. The second transmission device TM2 has first to eleventh gears as the speed stage.

As seen in FIG. 7, the control device CD1 is configured to store a transmission route R1 in the memory M21 (FIG. 2). The control device CD2 is configured to store the transmission route R1 in the memory M22 (FIG. 2). The transmission route R1 includes synchro-shift points which are each circled with a single circle. In the illustrated embodiment, the control device is configured to control both the first transmission device TM1 and the second transmission device TM2 to shift speed stages at the speed stage corresponding to the synchro-shift point in response to a single shift signal from the operating device 14.

In the illustrated embodiment, the transmission route R1 is used for both upshifting and downshifting. Each of the control devices CD1 and CD2 can be configured to store an upshift route for upshifting and a downshift route, which is different from the upshift route, for downshifting if needed and/or desired.

As seen in FIG. 7, in the transmission route R1, first to seventh gears of the first transmission device TM1 are used for low gear of the second transmission device TM2. Sixth to eleventh gears of the first transmission device TM1 are used for top gear of the second transmission device TM2. Namely, the bicycle operating system 12 has thirteen speed stages on the transmission route R1.

In a case where the first transmission device TM1 is in sixth gear and the second transmission device TM2 is in low gear in the synchro mode, the control device CD1 controls the first transmission device TM1 to upshift in response to the upshift signal from the operating device 14. Meanwhile, the control device CD2 controls the second transmission device TM2 to keep in low gear regardless of the shift signals from the operating devices 14 and 16.

In a case where the first transmission device TM1 is in seventh gear and the second transmission device TM2 is in top gear in the synchro mode, the control device CD1 controls the first transmission device TM1 to downshift in response to the downshift signal from the operating device 14. Meanwhile, the control device CD2 controls the second transmission device TM2 to keep in top gear regardless of the shift signals from the operating devices 14 and 16.

In a case where the first transmission device TM1 is in seventh gear and the second transmission device TM2 is in low gear in the synchro mode, the control device CD1 controls the first transmission device TM1 to downshift and the second transmission device TM2 to upshift in response to the upshift signal from the operating device 14 without the shift signal from the operating device 16.

In a case where the first transmission device TM1 is in sixth gear and the second transmission device TM2 is in top gear in the synchro mode, the control device CD1 controls the first transmission device TM1 to upshift and the second transmission device TM2 to downshift in response to the downshift signal from the operating device 14 without the shift signal from the operating device 16.

With the bicycle operating system 12, the signal controller SC1 is configured to generate the pairing demand signal in response to the input operation of the operating switch SW11. The wireless transmitter WT1 is configured to wirelessly transmit the pairing demand signal to a bicycle component to establish a wireless communication with the bicycle component. Accordingly, it is possible to make it easier to perform the pairing mode using the operating device 14. The same can be applied to the operating device 16.

Second Embodiment

A bicycle operating system 212 in accordance with a second embodiment will be described below referring to FIG. 8. The bicycle operating system 212 has the same configuration as the bicycle operating system 12 except for the transmission controller. Thus, elements having substantially the same function as those in the first embodiment will be numbered the same here, and will not be described and/or illustrated again in detail here for the sake of brevity.

Figure 8:
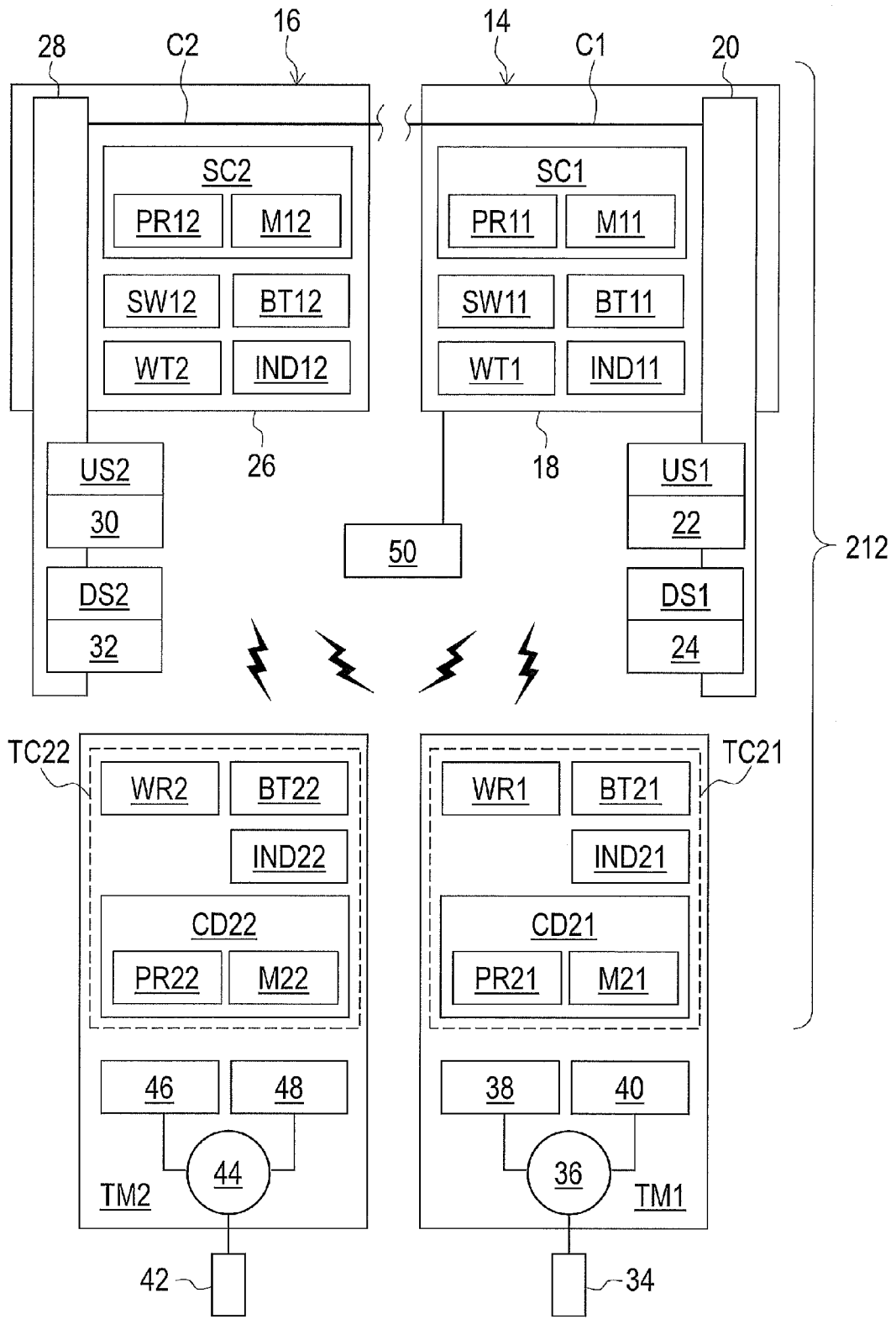
FIG. 8 is a block diagram of a bicycle operating system in accordance with a second embodiment.

As seen in FIG. 8, the bicycle operating system 212 comprises a transmission controller TC21 and a transmission controller TC22. The transmission controller TC21 has substantially the same configuration as that of the transmission controller TC1 in accordance with the first embodiment. The transmission controller TC22 has substantially the same configuration as that of the transmission controller TC2 in accordance with the first embodiment.

Unlike the transmission controller TC1, the transmission controller TC21 does not include the pairing mode switch SW21. In the illustrated embodiment, the transmission controller TC21 includes the wireless receiver WR1 and a control device CD21. The control device CD21 has substantially the same configuration as that of the control device CD1 of the transmission controller TC1. However, the control device CD21 is configured to automatically enter the pairing mode in a case where the wireless receiver WR1 wirelessly receives the pairing demand signal from the operating device. In the illustrated embodiment, the control device CD21 is configured to determine whether the wireless receiver WR1 receives the pairing mode signal. The control device CD21 is configured to automatically enter the pairing mode in a case where the wireless receiver WR1 wirelessly receives the pairing demand signal from at least one of the operating devices 14 and 16.

In the pairing mode, the control device CD21 identifies the operating device based on the pairing demand signal received by the wireless receiver WR1. In the illustrated embodiment, in the pairing mode, the control device CD21 identifies at least one of the operating devices 14 and 16 based on the pairing demand signal received by the wireless receiver WR1.

The signal controller SC1 is configured to generate the pairing demand signal indicative of additional identifying information to identify the transmission controller. In the illustrated embodiment, the signal controller SC1 is configured to generate the pairing demand signal indicative of the additional identifying information to identify each of the transmission controllers TC21 and TC22. The signal controller SC1 is configured to store the additional identifying information indicative of each of the transmission controllers TC21 and TC22 in the memory M11. Possible examples of the additional identifying information include a model number of the transmission controller and a model number of the transmission device corresponding to the transmission controller.

Similarly, the signal controller SC2 is configured to generate the pairing demand signal indicative of additional identifying information to identify the transmission controller. In the illustrated embodiment, the signal controller SC2 is configured to generate the pairing demand signal indicative of the additional identifying information to identify each of the transmission controllers TC21 and TC22. The signal controller SC2 is configured to store the additional identifying information indicative of each of the transmission controllers TC21 and TC22 in the memory M12.

While the pairing demand signal indicates the additional identifying information to identify the transmission controller in the illustrated embodiment, the pairing demand signal can indicate the identifying information indicative of the operating device instead of or in addition to the additional identifying information.

The control device CD21 is configured to determine whether the additional identifying information indicates the transmission controller TC1 in the pairing mode. The control device CD21 is configured to establish the wireless communication with the operating device 14 in a case where it is determined that the additional identifying information indicates the transmission controller TC21.

Similarly, the control device CD21 is configured to determine whether the additional identifying information indicates the transmission controller TC2 in the pairing mode. The control device CD21 is configured to establish the wireless communication with the operating device 14 in a case where it is determined that the additional identifying information indicates the transmission controller TC22.

Since the above configuration of the control device CD21 is applied to the control device CD22, it will not be described in detail here for the sake of brevity.

With the bicycle operating system 212, it is possible to obtain substantially the same advantageous effect as that of the bicycle operating system 12 in accordance with the first embodiment.

Furthermore, the control device CD21 is configured to automatically enter the pairing mode in the case where the wireless receiver WR1 wirelessly receives the pairing demand signal from the operating device 14. Accordingly, it is possible to make it easier to perform the pairing mode using the operating device 14 without the pairing mode switch SW21. The same can be applied to the pairing mode between the operating device 16 and the transmission controller TC21, the pairing mode between the operating device 14 and the transmission controller TC22, and the pairing mode between the operating device 16 and the transmission controller TC22.

Third Embodiment

A bicycle operating system 312 in accordance with a third embodiment will be described below referring to FIG. 9. The bicycle operating system 312 has the same configuration as the bicycle operating system 12 except for the operating device. Thus, elements having substantially the same function as those in the above embodiments will be numbered the same here, and will not be described and/or illustrated again in detail here for the sake of brevity.

Figure 9:
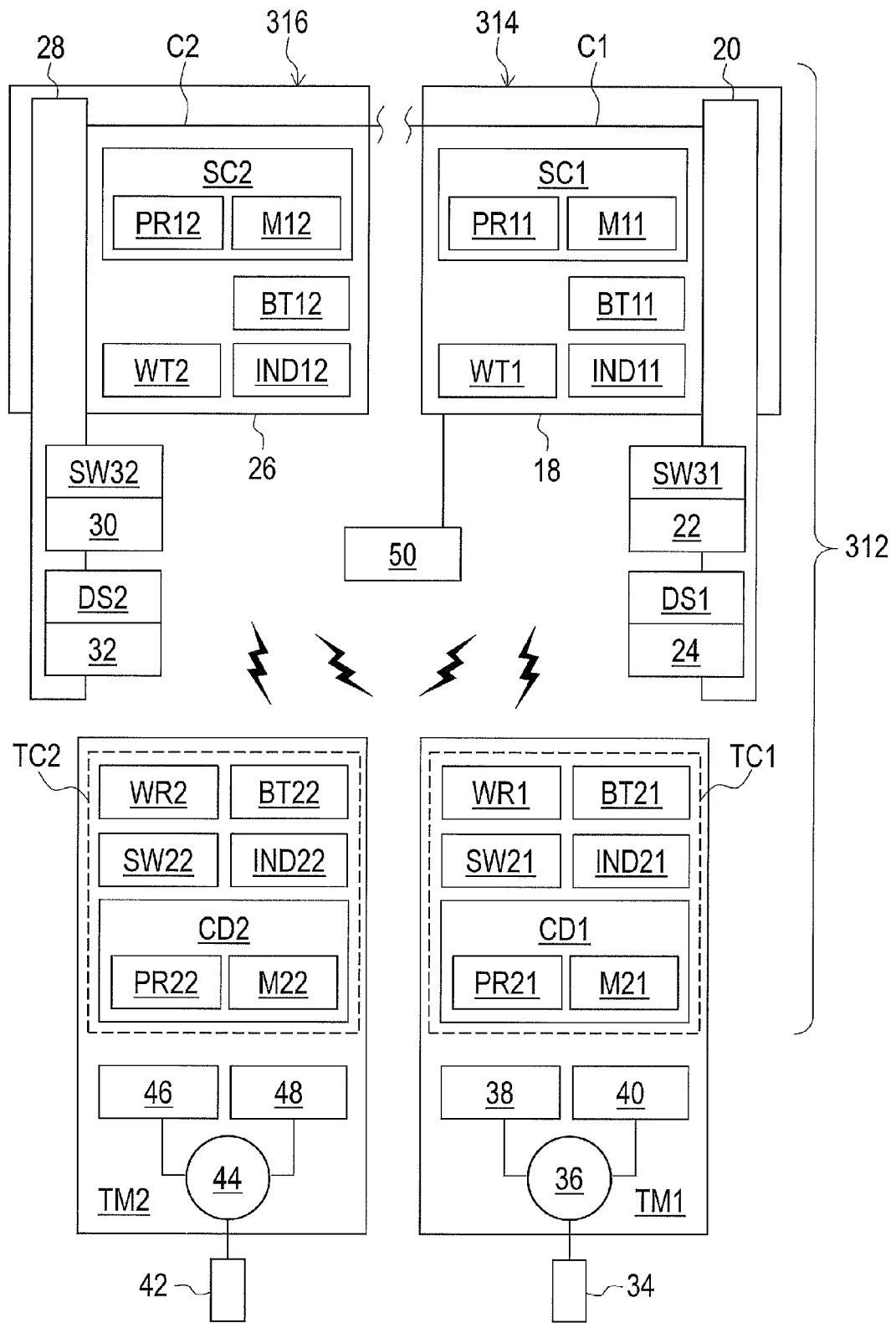
FIG. 9 is a block diagram of a bicycle operating system in accordance with a third embodiment.

As seen in FIG. 9, the bicycle operating system 312 comprises an operating device 314 and an operating device 316. The operating device 314 has substantially the same configuration as that of the operating device 14 in accordance with the first embodiment. The operating device 316 has substantially the same configuration as that of the operating device 16 in accordance with the first embodiment.

Unlike the operating device 14 in accordance with the first embodiment, the operating device 314 includes an operating switch SW31 and the additional operating switch DS1. In the illustrated embodiment, the operating switch SW11 and the shift operating switch US1 are combined as the operating switch SW31. The operating switch SW31 is mounted to the lever 20.

The signal controller SC1 is configured to generate a shift signal in response to an input operation of the operating switch SW31. The input operation includes a first input operation and a second input operation different from the first input operation. The signal controller SC1 is configured to generate the shift signal (e.g., the upshift signal) in response to the first input operation (i.e., the input upshift operation) of the operating switch SW31. The signal controller SC1 is configured to generate the pairing demand signal in response to the second input operation of the operating switch SW31.

In the illustrated embodiment, the first input operation is an operation that the operating switch SW31 is instantaneously operated by the user. Meanwhile, the second input operation is an operation that the operating switch SW31 is operated and held to keep turning on the operating switch SW31 for a specific period of time.

The wireless transmitter WT1 is configured to wirelessly transmit the shift signal (e.g., the upshift signal) to the wireless receiver WR1 of the transmission controller TC1. The wireless transmitter WT1 is configured to wirelessly transmit the shift signal (e.g., the upshift signal) to the wireless receiver WR2 of the transmission controller TC2.

The signal controller SC1 is configured to generate an additional shift signal (e.g., the downshift signal) in response to an additional input operation (i.e., the input downshift operation) of the additional operating switch DS1. The wireless transmitter WT1 is configured to wirelessly transmit the additional shift signal (e.g., the downshift signal) to the transmission controller TC1. The wireless transmitter WT1 is configured to wirelessly transmit the additional shift signal (e.g., the downshift signal) to the transmission controller TC2.

The control device CD1 is configured to determine whether the shift signal received by the wireless receiver WR1 is transmitted from the wireless transmitter WT1 of the operating device 14 which is identified by the control device CD1. The control device CD1 is configured to determine whether the shift signal received by the wireless receiver WR1 is transmitted from the wireless transmitter WT2 of the operating device 16 which is identified by the control device CD1.

The control device CD1 is configured to determine whether the additional shift signal received by the wireless receiver WR1 is transmitted from the wireless transmitter WT1 of the operating device 14 which is identified by the control device CD1. The control device CD1 is configured to determine whether the additional shift signal received by the wireless receiver WR1 is transmitted from the wireless transmitter WT2 of the operating device 16 which is identified by the control device CD1.

The control device CD1 controls at least one transmission device (e.g., the first transmission device TM1) to shift speed stages based on the shift signal (e.g., the upshift signal) in a case where it is determined that the shift signal is transmitted from the wireless transmitter of the operating device which is identified by the control device CD1. The control device CD2 controls at least one transmission device (e.g., the second transmission device TM2) to shift speed stages based on the shift signal (e.g., the upshift signal) in a case where it is determined that the shift signal is transmitted from the wireless transmitter of the operating device which is identified by the control device CD2.

The control device CD1 controls at least one transmission device (e.g., the first transmission device TM1) to shift speed stages based on the additional shift signal (e.g., the downshift signal) in a case where it is determined that the additional shift signal is transmitted from the wireless transmitter of the operating device which is identified by the control device CD1. The control device CD2 controls at least one transmission device (e.g., the second transmission device TM2) to shift speed stages based on the additional shift signal (e.g., the downshift signal) in a case where it is determined that the additional shift signal is transmitted from the wireless transmitter of the operating device which is identified by the control device CD2.

While the operating switch SW11 and the shift operating switch US1 are combined as the operating switch SW31, the operating switch SW11 and the shift operating switch DS1 can be combined as the operating switch SW31 if needed and/or desired. In such an embodiment, the operating device 14 includes the operating switch SW31 and the shift operating switch US1.

Unlike the operating device 16 in accordance with the first embodiment, the operating device 316 includes an operating switch SW32 and the additional operating switch DS2. In the illustrated embodiment, the operating switch SW12 and the shift operating switch US2 are combined as the operating switch SW32. Since the configurations of the operating device 316 is the same as those of the operating device 314, they will not be described in detail here for the sake of brevity.

With the bicycle operating system 312, it is possible to obtain substantially the same advantageous effect as that of the bicycle operating system 12 in accordance with the first embodiment.

Furthermore, the signal controller SC1 configured to generate the pairing demand signal in response to the input operation of the operating switch SW31. The signal controller SC1 is configured to generate the shift signal in response to the input operation of the operating switch SW31. Accordingly, it is possible to omit the shift operating switch US1 from the operating device 314, simplifying the configuration of the operating device 314. The same can be applied to the operating device 316.

Fourth Embodiment

A bicycle operating system 412 in accordance with a fourth embodiment will be described below referring to FIG. 10. The bicycle operating system 412 has the same configuration as the bicycle operating systems 12, 212 and 312. Thus, elements having substantially the same function as those in the above embodiments will be numbered the same here, and will not be described and/or illustrated again in detail here for the sake of brevity.

Figure 10:
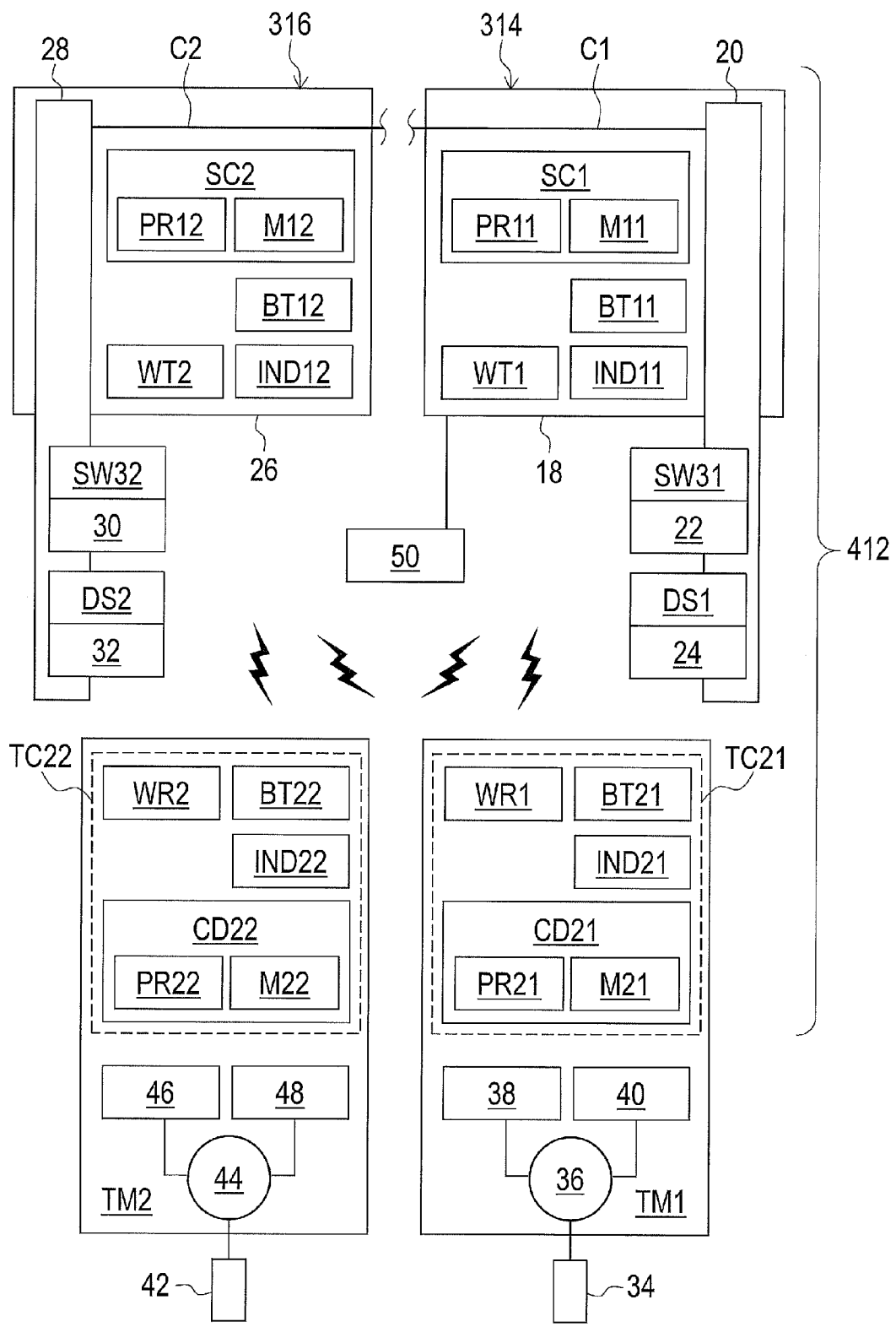
FIG. 10 is a block diagram of a bicycle operating system in accordance with a fourth embodiment.

As seen in FIG. 10, the bicycle operating system 412 comprises the operating device 314 and the operating device 316 in accordance with the third embodiment. Furthermore, the bicycle operating system 412 comprises the transmission controller TC21 and the transmission controller TC22 in accordance with the second embodiment. Namely, the bicycle operating systems 212 and 312 in accordance with the second and third embodiments are combined to provide the bicycle operating system 412.

The control device CD21 is configured to automatically enter the pairing mode in a case where the wireless receiver WR1 wirelessly receives the pairing demand signal from the operating device. In the illustrated embodiment, the control device CD21 is configured to determine whether the wireless receiver WR1 receives the pairing mode signal. The control device CD21 is configured to automatically enter the pairing mode in a case where the wireless receiver WR1 wirelessly receives the pairing demand signal from at least one of the operating devices 314 and 316.

In the pairing mode, the control device CD21 identifies the operating device 314 and/or 316 based on the pairing demand signal received by the wireless receiver WR1. The signal controller SC1 is configured to generate the pairing demand signal indicative of the additional identifying information to identify the transmission controller TC21. The control device CD21 is configured to determine whether the additional identifying information indicates the transmission controller TC21 in the pairing mode. The control device CD21 is configured to establish the wireless communication with the operating device 314 and/or 316 in a case where it is determined that the additional identifying information indicates the transmission controller TC21.

The control device CD21 is configured to determine whether the shift signal received by the wireless receiver WR1 is transmitted from the wireless transmitter WT1 of the operating device 314 which is identified by the control device CD21. The control device CD21 is configured to determine whether the shift signal received by the wireless receiver WR1 is transmitted from the wireless transmitter WT2 of the operating device 316 which is identified by the control device CD21.

The control device CD21 controls at least one transmission device to shift speed stages based on the shift signal in a case where it is determined that the shift signal is transmitted from the wireless transmitter of the operating device which is identified by the control device CD21. In the illustrated embodiment, the control device CD21 controls the first transmission device TM1 to shift speed stages based on the shift signal in a case where it is determined that the shift signal is transmitted from the wireless transmitter WT1 of the operating device 314 which is identified by the control device CD21. The control device CD21 controls the first transmission device TM1 to shift speed stages based on the shift signal in a case where it is determined that the shift signal is transmitted from the wireless transmitter WT2 of the operating device 316 which is identified by the control device CD21.

With the bicycle operating system 412, it is possible to obtain substantially the same advantageous effect as that of each of the bicycle operating systems 12, 212 and 312 in accordance with the first to third embodiments.

Fifth Embodiment

A bicycle operating system 512 in accordance with a fifth embodiment will be described below referring to FIG. 11.

The bicycle operating system 512 has the same configuration as the bicycle operating system 12 except for the operating device. Thus, elements having substantially the same function as those in the above embodiments will be numbered the same here, and will not be described and/or illustrated again in detail here for the sake of brevity.

Figure 11:
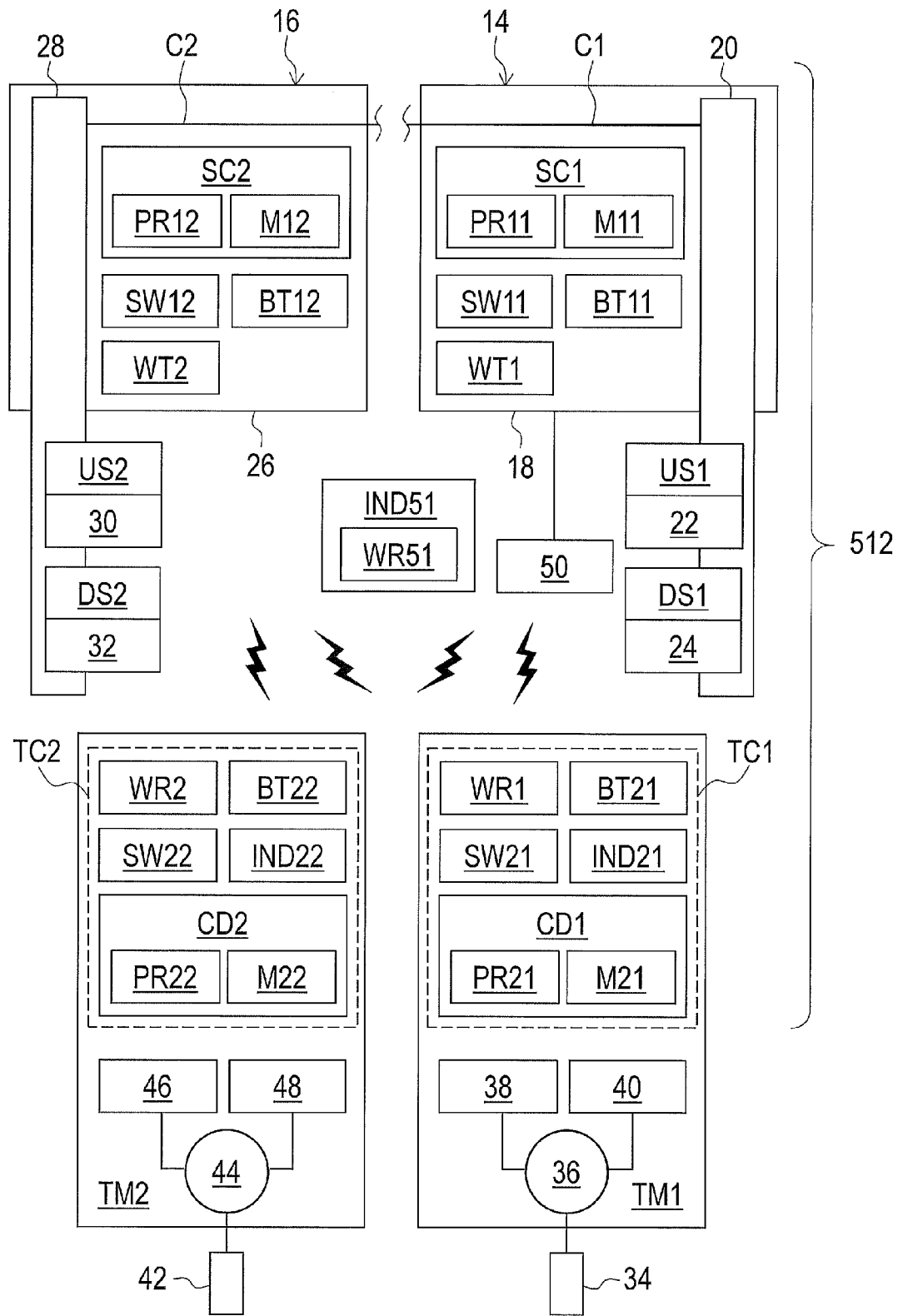
FIG. 11 is a block diagram of a bicycle operating system in accordance with a fifth embodiment.

As seen in FIG. 11, unlike the bicycle operating system 12 in accordance with the first embodiment, the bicycle operating system 512 further comprises an indicator IND51 configured to display at least a status of the operating device 14. In the illustrated embodiment, the indicator IND51 is a cycle computer and is separately provided from the operating devices 14 and 16. The indicators IND11 and IND12 are omitted from the operating devices 14 and 16. The indicator IND51 is configured to display whether the operating device 14 is in the pairing mode or is not in the pairing mode. The indicator IND51 is configured to display whether the operating device 16 is in the pairing mode or is not in the pairing mode.

The wireless transmitter WT1 is configured to wirelessly transmit a state of the operating device 14 to the indicator IND51. The wireless transmitter WT2 is configured to wirelessly transmit a state of the operating device 16 to the indicator IND51. The indicator IND51 includes an additional wireless receiver WR51 configured to wirelessly receive the states of the operating devices 14 and 16 from the wireless transmitters WT1 and WT2, respectively.

With the bicycle operating system 512, it is possible to obtain substantially the same advantageous effect as that of the bicycle operating system 12 in accordance with the first embodiment.

It will be apparent to those skilled in the bicycle field from the present disclosure that the above embodiments can be at least partially combined with each other. For example, the indicator IND51 in accordance with the fifth embodiment can be applied to each of the first to fourth embodiments if needed and/or desired.

If pairing has been completed between one of the operating devices 14 and 16 and one of the first and second transmission devices TM1 and TM2, pairing can be omitted between the other of the operating devices 14 and 16 and the other of the first and second transmission devices TM1 and TM2. In such an embodiment, for example, the other of the first and second transmission devices TM1 and TM2 can determine shift signals from the other of the operating devices 14 and 16 based on ID information of the shift signals.

A distance between the front transmission device (e.g., the second transmission device TM2) and the operating device (e.g., the operating device 16) for the front transmission device is shorter than a distance between the rear transmission device (e.g., the first transmission device TM1) and the operating device (e.g., the operating device 14) for the rear transmission device. Accordingly, the wireless transmitter WT2 of the operating device 16 can have wireless signals weaker than wireless signals of the wireless transmitter WT1 of the operating device 14. Namely, the operating device for the front transmission device can be configured to operate under lower power consumption (e.g., at a lower current) in comparison with the operating device for the rear transmission device.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating system comprising:
   an operating device configured to be mounted to a bicycle body, the operating device including
      an operating switch,
      a signal controller configured to generate a pairing demand signal in response to an input operation of the operating switch, and
      a wireless transmitter configured to wirelessly transmit the pairing demand signal to a bicycle component to establish a wireless communication with the bicycle component.

2. The bicycle operating system according to claim 1, wherein
   the signal controller is configured to store identifying information relating to the operating device, and
   the signal controller is configured to generate the pairing demand signal indicative of the identifying information in response to the input operation of the operating switch.

3. The bicycle operating system according to claim 1, further comprising:
   a transmission controller including
      a wireless receiver configured to wirelessly receive the pairing demand signal from the wireless transmitter, and
      a controller configured to identify the operating device based on the pairing demand signal received by the wireless receiver to establish the wireless communication with the operating device.

4. The bicycle operating system according to claim 3, wherein
   the transmission controller includes a pairing mode switch configured to bring the controller into a pairing mode in response to a mode switching operation from the user, and
   in the pairing mode, the controller identifies the operating device based on the pairing demand signal received by the wireless receiver.

5. The bicycle operating system according to claim 4, wherein
   the operating device includes a shift operating switch, and
   the signal controller is configured to generate a shift signal in response to an input shift operation of the shift operating switch.

6. The bicycle operating system according to claim 5, wherein
   the wireless transmitter is configured to wirelessly transmit the shift signal to the wireless receiver of the transmission controller,
   the controller is configured to determine whether the shift signal received by the wireless receiver is transmitted from the wireless transmitter of the operating device which is identified by the controller, and
   the controller controls at least one transmission component to shift speed stages based on the shift signal in a case where it is determined that the shift signal is transmitted from the wireless transmitter of the operating device which is identified by the controller.

7. The bicycle operating system according to claim 4, wherein
   the signal controller is configured to generate a shift signal in response to the input operation of the operating switch.

8. The bicycle operating system according to claim 7, wherein
   the input operation includes a first input operation and a second input operation different from the first input operation,
   the signal controller is configured to generate the shift signal in response to the first input operation of the operating switch, and
   the signal controller is configured to generate the pairing demand signal in response to the second input operation of the operating switch.

9. The bicycle operating system according to claim 8, wherein
   the wireless transmitter is configured to wirelessly transmit the shift signal to the wireless receiver of the transmission controller,
   the controller is configured to determine whether the shift signal received by the wireless receiver is transmitted from the wireless transmitter of the operating device which is identified by the controller, and
   the controller controls at least one transmission component to shift speed stages based on the shift signal in a case where it is determined that the shift signal is transmitted from the wireless transmitter of the operating device which is identified by the controller.

10. The bicycle operating system according to claim 9, wherein
    the operating device includes an additional operating switch,
    the signal controller is configured to generate an additional shift signal in response to an additional input operation of the additional operating switch, and
    the wireless transmitter is configured to wirelessly transmit the additional shift signal to the transmission controller.

11. The bicycle operating system according to claim 10, wherein
    the controller is configured to determine whether the additional shift signal received by the wireless receiver is transmitted from the wireless transmitter of the operating device which is identified by the controller, and the controller controls the at least one transmission component to shift speed stages based on the additional shift signal in a case where it is determined that the additional shift signal is transmitted from the wireless transmitter of the operating device which is identified by the controller.

12. The bicycle operating system according to claim 3, wherein the controller is configured to automatically enter a pairing mode in a case where the wireless receiver wirelessly receives the pairing demand signal from the operating device, and in the pairing mode, the controller identifies the operating device based on the pairing demand signal received by the wireless receiver.

13. The bicycle operating system according to claim 12, wherein the signal controller is configured to generate the pairing demand signal indicative of additional identifying information to identify the transmission controller, the controller is configured to determine whether the additional identifying information indicates the transmission controller in the pairing mode, and the controller is configured to establish the wireless communication with the operating device in a case where it is determined that the additional identifying information indicates the transmission controller.

14. The bicycle operating system according to claim 12, wherein the operating device includes a shift operating switch, and the signal controller is configured to generate a shift signal in response to an input shift operation of the shift operating switch.

15. The bicycle operating system according to claim 14, wherein the wireless transmitter is configured to wirelessly transmit the shift signal to the wireless receiver of the transmission controller, the controller is configured to determine whether the shift signal received by the wireless receiver is transmitted from the wireless transmitter of the operating device which is identified by the controller, and the controller controls at least one transmission component to shift speed stages based on the shift signal in a case where it is determined that the shift signal is transmitted from the wireless transmitter of the operating device which is identified by the controller.

16. The bicycle operating system according to claim 12, wherein the signal controller is configured to generate a shift signal in response to the input operation of the operating switch.

17. The bicycle operating system according to claim 16, wherein the input operation includes a first input operation and a second input operation different from the first input operation, the signal controller is configured to generate the shift signal in response to the first input operation of the operation switch, and the signal controller is configured to generate the pairing demand signal in response to the second input operation of the operation switch.

18. The bicycle operating system according to claim 17, wherein the wireless transmitter is configured to wirelessly transmit the shift signal to the wireless receiver of the transmission controller, the controller is configured to determine whether the shift signal received by the wireless receiver is transmitted from the wireless transmitter of the operating device which is identified by the controller, and the controller controls at least one transmission component to shift speed stages based on the shift signal in a case where it is determined that the shift signal is transmitted from the wireless transmitter of the operating device which is identified by the controller.

19. The bicycle operating system according to claim 18, wherein the operating device includes an additional operating switch, the signal controller is configured to generate an additional shift signal in response to the additional input operation of the additional operating switch, and the wireless transmitter is configured to wirelessly transmit the additional shift signal to the transmission controller.

20. The bicycle operating system according to claim 19, wherein the controller is configured to determine whether the additional shift signal received by the wireless receiver is transmitted from the wireless transmitter of the operating device which is identified by the controller, and the controller controls the at least one transmission component to shift speed stages based on the additional shift signal in a case where it is determined that the additional shift signal is transmitted from the wireless transmitter of the operating device which is identified by the controller.

21. The bicycle operating system according to claim 1, wherein the operating device includes an indicator configured to display a status of the operating device.

22. The bicycle operating system according to claim 21, wherein the indicator is configured to display whether the operating device is in a pairing mode or is not in the pairing mode.

23. The bicycle operating system according to claim 1, further comprising:

an indicator configured to display at least a status of the operating device.

24. The bicycle operating system according to claim 23, wherein the indicator is configured to display whether the operating device is in a pairing mode or is not in the pairing mode.

25. The bicycle operating system according to claim 1, wherein the wireless transmitter is configured to repeatedly transmit the pairing demand signal in response to the input operation of the operating switch.

26. The bicycle operating system according to claim 1, further comprising:

a transmission controller including a wireless receiver configured to wirelessly receive the pairing demand signal from the wireless transmitter, and a controller configured to enter a pairing mode in which the controller controls the wireless receiver to scan a plurality of channels.

\* \* \* \* \*